Patented Mar. 14, 1950

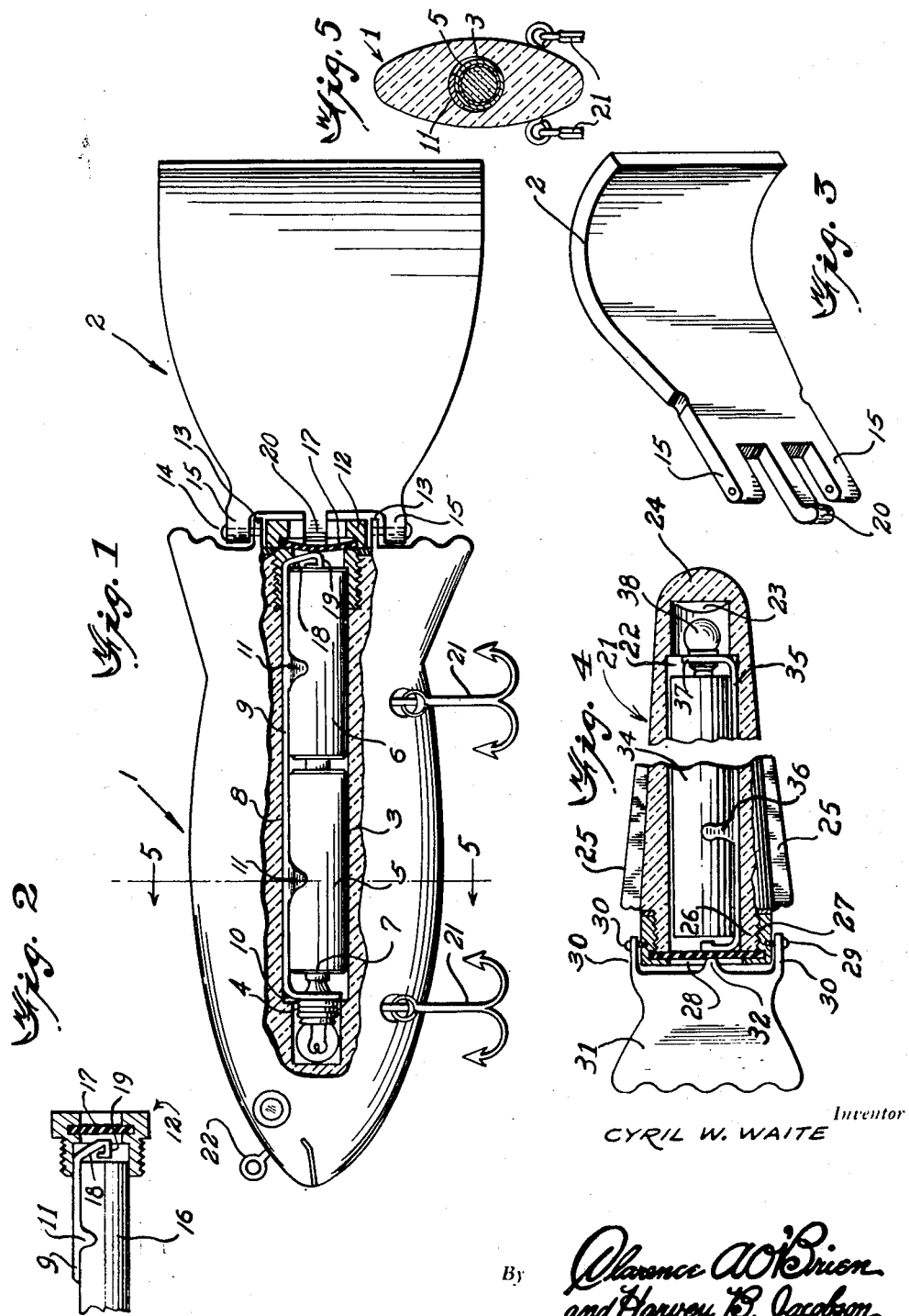

2,500,442

UNITED STATES PATENT OFFICE 2,500,442

ARTIFICIAL FISH BAIT

Cyril W. Waite, Cleveland, Ohio

Application December 11, 1945, Serial No. 634,243

6 Claims. (Cl. 43—42.07)

1

This invention relates to refinements and improvements in artificial lures and fish baits simulating the appearance of a live fish, and the principal object of the invention is to provide an intermittent structurally novel device of a luminous character which, while submerged, will increase its attraction properties and usefulness.

A further object of the invention is to provide a luminous bait the lighting facilities of which will function intermittently, thus further increasing its purpose of attracting the fish.

A further object of the invention is to provide a novel mechanism automatically actuated by the movement of the bait through water, whereby the intermittent lighting action of the luminous means will be effectively operated.

A further object of the invention is to provide a clever and therefore unique bait wherein the source of luminous power includes simple dry cells such as can readily be replaced as required.

A further object of the invention is to provide a bait which is of sturdy construction, yet simple in operation and which is suitably adapted to function satisfactorily under water.

With the above and more important objects in view such further objects as may be apparent as this specification proceeds, the invention consists essentially of the arrangement and construction of parts as shown in the accompanying drawings.

Referring now to the drawings in detail—

Figure 1 is a side elevation of the invention partially broken away to show its mechanical structure.

Figure 2 is a cross sectional detail of a contact plug.

Figure 3 is a perspective view showing the arrangement of the tail portion, and

Figure 4 is a fragmentary side view partly in section and partly in elevation and showing a modified form in which the invention may be constructed.

Figure 5 is a vertical cross sectional view taken on the plane of the line 5—5 of Figure 1, looking in the direction of the arrows.

Briefly, and by way of introduction to the detailed description, my invention has to do with an artificial bait which simulates the appearance of a fish and which is characterized by a translucent body portion and a tail hingedly connected to the tail end of the body portion. The body portion is provided with a longitudinal bore which defines a socket and a bulb and a plurality of dry cell batteries are positioned in the socket. In addition, a battery assembling and retaining clip is located in the socket to hold the bulb and batteries in place. A water-tight closure is provided for the outer end of said socket and includes an insulated disk therein, one end of said clip being continually grounded to said bulb and the other end thereof being positioned between said disk and said batteries, said tail having a cam finger which serves to close the circuit by way of said disk, clip, batteries and bulb upon swingable actuation of said tail.

Referring first to Figure 1, the invention comprises a suitable main body 1 to which is hingedly connected a freely flap-like tail 2. The body, particularly the forward end thereof, is made of suitable transparent or translucent material and is appropriately contoured, as shown, to simulate the appearance of a fish. A cylindrical bore 3 extends almost along the entire length of its longitudinal axis, which bore is reduced in diameter at the forward end to accommodate a small incandescent lamp or bulb 4. The bore 3 provides an open-ended socket and is designed to contain a pair of flashlight cells 5 and 6 placed end to end with the forward terminal 7 of the cell 5 pressing against the contact in the base of the bulb 4. Parallel with its axis and positioned upon the circumference of the bore 3 I provide a longitudinal recess 8 of essentially a semi-circular cross section. A current conductive clip 9 shaped, as shown, is positioned in the recess with its forward lateral extremity 10 continually contacting the ground of the bulb 4. The clip 9 is of elongated U-shaped form and also provided with two pairs of circumferentially extending wings 11 which are designed to grip and retain the cells 5 and 6 in properly interrelated positions.

The open rear end of the bore or socket 3 is suitably threaded to receive a plastic or equivalent screw plug 12 the structure of which will be further detailed in connection with Figure 2.

Provided at the rear end of the body 1 is a pair of vertically aligned hinge ears 13 carrying vertical hinge pins 14 to accommodate a pair of aligned hinge lugs 15, the latter being formed integrally with the tail 2.

Referring now to Figure 2, the screw plug 12 is provided with an outwardly threaded shank 16 and contains a suitable recess to accommodate a suitably cemented fluid-tight resilient disk 17. The latter, in actual practice, may be in the form of a neoprene diaphragm. Referring again to the aforementioned current conductor clip 9, it is to be noted that the right hand end thereof in Figure 1, as well as in Figure 2, is bent laterally as at 18 and the terminal is fashioned into a circuit make-and-break point 19 of hook-shaped form which is arranged to press, when placed under pressure, against the adjacent end of the dry cell 6. The neoprene disk or diaphragm 17 is such that it normally takes the straight position seen in Figure 2. It is obvious, however, that since said disk is flexible, it is forced into concavo-convex shape as shown in Figure 2 when the cam-finger 20 comes into play. In other words, since the cam finger 20 has wiping or sweeping contact with the disk, when the tail is swerved back and forth on its hinge pin, by action of the water, the disk 17 is intermittently dished and thus is pressed against the hook 19, forcing the hook into engagement with the dry cell 6 and thus closing the circuit and lighting the lamp or bulb 4.

Referring now to Figure 3, the tail 2 assumes the form of an arcuate flap substantially as shown, the forward end of which in addition to the hinge lugs 15 already referred to, also incorporates a contact finger 20. The free extremity of the latter is somewhat angulated to act as a cam and projects slightly beyond the center line of the lugs 15.

The body 1 is provided with the usual hooks 21 and also carries an eye 22 whereby the entire assembly may be connected to a fishing line (not shown).

In the form of the invention set forth in Figures 1 to 3, inclusive, the closure means for the outer, open end of the socket or bore is in the nature of a screw plug, as stated. The plug carries the flexible disk which is such that it may be pressed into concavo-convex form when put under pressure, and will assume its straight form (see Fig. 2) when not under pressure. Thus, the contact hook 19 is normally disengaged if the circuit is broken. Also the battery clip 9 is of general U-shaped form and one lateral end is connected with the base of the bulb, the left hand end, and the opposite end is fashioned into the stated contact elements for making and breaking the circuit. The two dry cells are snapped into place and held between the bulb and contact 19 and the wing-like portions 11 embrace the dry cell batteries, thus providing a suitable harness which facilitates inserting and removing the whole arrangement as a unitary assemblage. Reference is had now to the modification of the invention shown in Figure 4. Here, a suitable bulbous-shaped body 21 of appropriate transparent material is provided. On its interior there is a bore 22 defining a socket, the inner closed end of which is reduced and provided with a convex reflector 23. The reflector is thus arranged in the socket inwardly of the convexed nose portion 24. The body is rearwardly tapered and provided with appropriate, diametrically opposite fins 25 and the left hand end is reduced and screw threaded, as at 26, to provide a neck which accommodates the closure means. The closure means here is in the form of a cap with an internally screw threaded rim 27 threaded on said neck. The cap is provided with a central opening and mounted in said cap in water-proof cement or the like is the pressure applying neoprene disk or diaphragm 28. The cap is provided with a hinge pin 29 to accommodate lugs or ears 30 on the hingedly mounted, laterally swingable tail 31. Here, again, the tail is provided with a central cam presser finger 32 which has sweeping contact with the disk. The finger serves to press the disk against the lateral contact element 33 which, in turn, is forced against the dry cell 34 located in the socket. In this arrangement I also provide a U-shaped conductor clip 35 which is fitted in the socket and which has opposite lateral wings 36 embracing the dry cell. The lateral right hand end portion of the clip, as indicated at 37, is connected with the base, the screw base of the bulb or lamp 38, the latter being arranged in the reduced fore portion of the socket to coact with the nose 24 and reflector lens 23. It is obvious that there are common structural characteristics existing between both forms of the invention in that each embodies a socketed transparent body to accommodate a dry cell or dry cells and to accommodate a U-shaped conductor clip of metal, one end of the clip being connected with the bulb and suitably grounded, and the other end of the clip being fashioned into a convex element which is arranged for coaction with a flexible diaphragm or disk. The tail, which is vertically disposed, is swingable in a horizontal plane on vertical axes and is provided with a presser finger or cam which engages the disk, forcing the disk against the contact element and the contact element against the adjacent end of the battery.

The objects of the invention are thus fulfilled. It is to be understood, however, that even though there is herein shown and described preferred embodiments of the invention the same is susceptible to certain changes fully comprehended by the spirit of the invention as herein described and the scope of the appended claims.

Having thus described the invention, what I claim is:

1. An artificial fish bait simulating the appearance of a fish comprising a translucent body portion and a tail hingedly connected thereto, said body portion being provided with a longitudinal bore defining a socket, a bulb and a plurality of batteries positioned in said socket, a battery assembling and retaining clip in said socket, and a watertight closure for the outer open end of said socket, and including an insulated disk mounted therein, one end of said clip being continually grounded to said bulb and the other end thereof being positioned between said disk and said batteries, said tail having a cam finger serving to close the circuit by way of said disk, clip, batteries and said bulb upon swingable actuation of said tail.

2. An artificial fish bait simulating the appearance of a fish comprising a transparent body and a freely swingable tail hingedly connected to the rear end of said body, the body being provided with a longitudinal socket, closed at the inner end and open at the outer end, a bulb, and a plurality of batteries arranged for operation in said socket, the wall of the socket provided with a longitudinal recess, a battery retaining clip removably keyed in said recess, watertight closing means attached to the body at the open outer end of said socket and including a fluid-tight spring disk carried thereby and interposed between the same and the adjacent battery, one end of said clip continually contacting said bulb and the remaining end thereof being positioned between said disk and said battery and normally spaced therefrom, and a cam finger carried by said tail, said finger having pressure contact with the said disk in such manner that when the latter is flexed inwardly, it presses the last-named end of the clip against the coacting battery, thus closing the circuit.

3. The device as defined in claim 2, in which said body is provided with a pair of vertically aligned diametrically located stabilizer fins, and said tail is curvate and hinged on the trailing end of the body and is swingable laterally and horizontally to wipe said finger back and forth in pressure exerting contact with said disk.

4. In an artificial bait of the class described, a transparent body having a central longitudinal bore defining a socket, said socket being closed at its inner end and open at its outer end, the last-named end being internally screw threaded, a screw plug threaded into said last-named end, said plug being provided with a water-tight disk, the disk cooperating with said plug to serve as a closure for the open end of the socket, said disk being of resilient material, a tail provided at its inner end with lugs, and means mounting the lugs on the rear end of said body adjacent the screw plug and disk, the intermediate portion of the tail intermediate the lugs being provided with a projecting finger and said finger constituting a presser cam and being intermittently cooperable with said disk for pressing the disk into concavo-convex form.

5. An artificial bait of the class described comprising a centrally bored transparent body, the bore constituting a socket, said socket being closed at its inner end and being provided with an internal reflector, the opposite end of the body being formed into a reduced screw-threaded attaching neck, a screw cap threaded on said neck, a tail hingedly mounted on said cap, and a flexible disk mounted in said cap, said tail having a contact finger cooperable with said disk.

6. The structure specified in claim 5, together with a U-clip mounted in said socket and having means at its forward end adapted to support and be connected to the base of a bulb adapted to be disposed in said socket, said clip having lateral wings intermediate its ends, the opposite end of said clip having a lateral bend adapted for coaction with the disk and also with an adjacent end portion of the flashlight battery which is adapted to be removably supported in the clip.

CYRIL W. WAITE.

REFERENCES CITED

The following references are of record in the file of this patent:

UNITED STATES PATENTS

| Number | Name | Date |
| --- | --- | --- |
| 1,009,968 | Herrmann | Nov. 28, 1911 |
| 1,627,512 | Hughes | May 3, 1927 |
| 1,855,015 | Fraser et al. | Apr. 19, 1932 |
| 2,001,109 | Petrie | May 14, 1935 |
| 2,002,135 | Barton | May 21, 1935 |
| 2,165,734 | Stracener | July 11, 1939 |
| 2,217,565 | Seigle et al. | Oct. 8, 1940 |
| 2,237,534 | Van Der Clute | Apr. 8, 1941 |

OTHER REFERENCES

Fishes in the Home, by Ida M. Mellon, publication of the N. Y. Zoological Society, 1931. (Copyright 1927, Dodd, Mead & Co., Inc.)